United States Patent
Amaducci et al.

(10) Patent No.: US 12,081,117 B2
(45) Date of Patent: Sep. 3, 2024

(54) HIGH-FREQUENCY CURRENT SOURCE FOR AN ACTIVE EMI FILTER, ACTIVE EMI FILTER AND USE OF AN ACTIVE EMI FILTER

(71) Applicant: Schaffner EMV AG, Luterbach (CH)

(72) Inventors: Alessandro Amaducci, Deitingen (CH); Enrico Mazzola, Gerlafingen (CH)

(73) Assignee: Schaffner EMV AG, Luterbach (CH)

( * ) Notice: Subject to any disclaimer, the term of this patent is extended or adjusted under 35 U.S.C. 154(b) by 18 days.

(21) Appl. No.: 17/670,260

(22) Filed: Feb. 11, 2022

(65) Prior Publication Data

US 2022/0263407 A1   Aug. 18, 2022

(30) Foreign Application Priority Data

Feb. 17, 2021  (EP) ..................... 21157666

(51) Int. Cl.
  *H02M 1/15* (2006.01)
  *H02M 1/44* (2007.01)

(52) U.S. Cl.
  CPC ............... *H02M 1/44* (2013.01); *H02M 1/15* (2013.01)

(58) Field of Classification Search
  CPC .............................. H02M 1/15; H02M 1/123
  See application file for complete search history.

(56) References Cited

U.S. PATENT DOCUMENTS

| | | | | |
|---|---|---|---|---|
| 4,258,243 A | * | 3/1981 | Bell, Jr. | ................. B23H 1/024 219/69.19 |
| 6,107,886 A | | 8/2000 | Kusakabe et al. | |
| 2003/0128558 A1 | | 7/2003 | Takahashi et al. | |
| 2004/0207463 A1 | | 10/2004 | Pelly | |
| 2009/0243709 A1 | * | 10/2009 | Pan | .......................... G05F 3/30 327/539 |
| 2018/0269781 A1 | | 9/2018 | Amaducci | |

* cited by examiner

Primary Examiner — Peter M Novak
(74) Attorney, Agent, or Firm — Blank Rome LLP

(57) ABSTRACT

A high-frequency current source with a symmetric bipolar output stage piloted by an active bias network with an extended temperature range. The source is configured to provide a high impedance at 1 MHz and above. The invention includes such active EMI filters with such a high-frequency current source, for example in the current-sense current-inject feedback configuration.

8 Claims, 3 Drawing Sheets

HIGH-FREQUENCY CURRENT SOURCE FOR AN ACTIVE EMI FILTER, ACTIVE EMI FILTER AND USE OF AN ACTIVE EMI FILTER

REFERENCE DATA

The present application claims priority of European patent application EP2021157666 of Feb. 17, 2021, the content whereof are entirely incorporated.

TECHNICAL DOMAIN

The present invention concerns a high-frequency current source for an active and an active electromagnetic compatibility filter for suppressing an unwanted noise component superimposed on an electric supply line. Embodiments of the invention concern a filter placed behind a motor drive unit on a DC power bus, in an electric vehicle, although this is not the only application of the invention.

RELATED ART

Electric systems in vehicles and in industry are becoming ever more complex and include a multitude of components that generate, or are liable to be disturbed by, electromagnetic interferences. Electric motors, for example, are often driven by electronic inverters that control the motor speed and torque by generating waveforms with variable frequency and amplitude. These systems provide high efficiency but generate a powerful electromagnetic noise.

Switching power converters are used in electric and hybrid vehicles, as well as in countless other applications such as driving stationary motors, battery chargers, photovoltaic systems, lighting control, computers, and other. In all these cases, the switching action of the converter is a source of electromagnetic noise that could, if it is not managed or attenuated, affect the functioning of other systems, or exceed normative limits.

Electric or electronic filters used to attenuate these unwanted interferences, called EMI filters in short, are used in all branches of electric engineering to improve reliability and respect existing norms. Well-designed filtering system are essential to the performance of many complex electric systems.

Electric and hybrid vehicles are equipped with different power converters in a very tight space. This coexistence represents a serious electromagnetic problem and demands efficient EMI filtering. When the filters are not enough to bring the noise to acceptable levels, shielded cables can be used, but they contribute significantly to costs.

It is known to use passive low-pass LC filters to attenuate EMI. While passive solutions do offer substantial attenuation, they have their limits. Magnetic components rated for the current levels used in modern electric vehicles are bulky, expensive, heavy, and not always suitable for mass production.

Document US20180269781 discloses an active EMI filter for an electric vehicle. Active filters can be more compact than equivalent passive ones but providing a satisfactory active filter for the high-current wide-bandwidth interferences generated in electric vehicles is difficult.

Active filters are known in many variants and topologies. They generally include an output stage that must be fast enough to cancel noise in the desired band of frequency, have a dynamic matching the noise level, and adequate input and output impedances. Applications in the automotive fields pose unprecedented requirements in terms of speed and output current that are hard to satisfy with known architectures.

Conventional solutions cannot be applied in automotive applications due to more strict space, weight, reliability, and temperature requirements when excellent filter performance is required at the same time. Thus, solutions known from the prior art are either too bulky or unreliable when operated in an extended temperature range, as needed for an automotive application.

Active filters rely necessarily on an auxiliary power supply. In some cases, the auxiliary power supply must be bipolar, which may not be economically available.

The stopband (the interval of frequency in which the attenuation is sensible) of an active EMI filter will be chosen according to the need. In most applications, including in vehicles, it is expected that an EMI filter should be effective in a band of frequencies between 1 kHz and some tens of MHz, possibly up to 30 MHz or 50 MHz. In the following, this interval of frequency may be indicated conventionally as "HF" or "high frequency", while the part of spectrum between below this interval and down to 0 may be conventionally indicated as "DC".

SHORT DISCLOSURE OF THE INVENTION

An aim of the present invention is the provision of a filter that overcomes the shortcomings and limitations of the state of the art.

According to the invention, these aims are attained by the object of the attached claims, and especially by a high-frequency current source comprising a output provided by an output network with two bipolar transistor in a symmetric common-emitter configuration connected between a upper supply rail with a first potential and a lower supply rail with a second potential, an active bias network determining the operating point of the two bipolar transistors, and an analogue control network receiving the output and producing a DC correction signal that is fed to the active bias network to stabilize a DC value of the output, and a HF input controlling a high-frequency output current, wherein the analogue control network is configured to maintain a DC potential at the output in a predetermined interval between the first and the second potential. The predetermined interval may be limited or set to a predetermined DC potential, in which the DC potential is maintained in the middle of a potential difference between the first and the second potential.

The active bias network comprises preferably a temperature-sensitive element such as a diode array configured to compensate a temperature variability of the transistor's characteristics. The current source needs only a unipolar power supply and the active bias circuit is configured to maintain the DC output in the middle point between the upper and lower rail over an extended range of temperatures, which is very useful when the source is used in an EMI filter. The output impedance is at least 1 kohm at 30 MHz, and 2 kohm are possible by a suitable choice of the output transistors. The maximum output current may be of 1 or 2 ampere and the allowable temperature operating range extends at least between −40° C. and 125° C.

The invention relates also to an active EMI filter comprising the high-frequency current source above, which may have a sense unit, which could be a current transformer, configured to sense a noise signal circulating in a power line from a noise source to a load, control the high-frequency current source according to the noise signal, inject the high-frequency output current of the high-frequency current source into the power line through a current-inject unit. In many applications, the noise signal will be a common-mode unwanted noise current) and may be picked up by a current transformer on the power line, but the invention is not limited to filter of the current-sense variety, nor to feedback filters.

The invention also relates to the use of the above active EMI filter on the power bus of an electric or hybrid vehicle.

SHORT DESCRIPTION OF THE DRAWINGS

Exemplar embodiments of the invention are disclosed in the description and illustrated by the drawings in which.

EXAMPLES OF EMBODIMENTS OF THE PRESENT INVENTION

Figure 1:
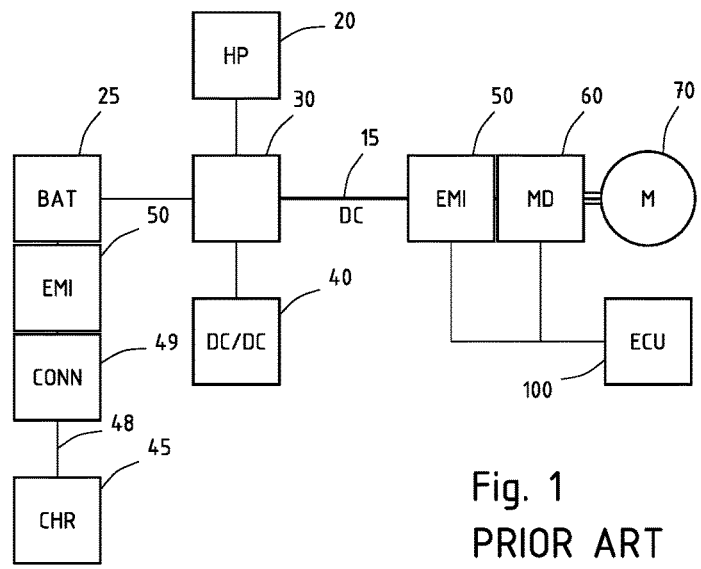
FIG. 1 illustrates schematically a possible structure of an electric vehicle in which the filter of the invention can be employed.

FIG. 1 shows in a very simplified fashion the main components of an electric vehicle. The energy necessary to the traction is stored in a battery pack 45 and may be replenished by the charger 45 or—in the case of a hybrid vehicle—by a non-illustrated combustion motor. The battery pack 25 is connected to a power distribution unit 30 that distributes the power to various loads, for instance an DC/DC converter 40 for generating a 12V voltage for auxiliary equipment (entertainment, lights, on-board computers, etc.), and heat pumps 20 for the heating/ear conditioning. Importantly, a high-voltage DC bus 15 transmits the voltage of the battery to a motor drive unit 60 that includes an inverter generating multiphase AC waveforms suitable for the electric traction motor 70. An EMI filter 50 is inserted on the DC bus 15 at the supply point of the drive unit 60 to filter out the noise generated by the inverter in the latter.

The configuration of FIG. 1 is just one among the various possibilities and is provided merely as a non-limiting example of one possible use of the invention. The invention may be used in electric vehicles presenting various configurations, for example in series-hybrid, parallel-hybrid, plug-in-hybrid configurations that do not correspond to the diagram of FIG. 1. The invention is not limited to automotive applications, either.

FIG. 1 shows two EMI filters 50, one between battery 25 and charging connector 49, and one on the DC side of the motor drive 60. The inventive EMI filter may be used in other positions without leaving the scope of the invention. Meaningful locations for EMI filters are: before and after the charger 45; after the battery 25; before the DC/DC converter 40. The charging unit 45 may be totally or in part installed after the connector 49. All these variants are included in the scope of the invention defined by the appended claims.

Figure 2:
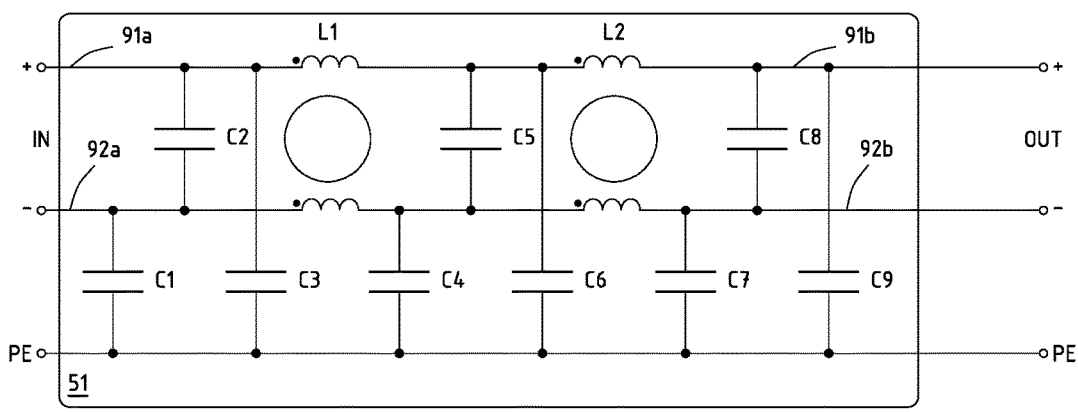
FIG. 2 shows a conventional passive EMI filter.

FIG. 2 shows a possible structure of a passive EMI filter 51 as known in the art. The filter is configured as a two-stage LC filter with two common-mode chokes L1 and L2 and several capacitors connected between the positive and negative power rails (X-capacitors C2, C5, C8) or between a power rail and the protective earth conductor (Y-capacitors C1, C3, C4, C6, C7, C9). Such filters can be designed to provide an effective attenuation of noise at the price of an increase in size, weight, and manufacturing cost.

According to the needs, an EMC filter can be designed to attenuate differential and/or common mode noise. Common mode noise appears simultaneously with the same polarity on all the conductors of the supply bus and is often dominant. The filter of FIG. 2 is designed to attenuate primarily common-mode noise.

Figure 3:
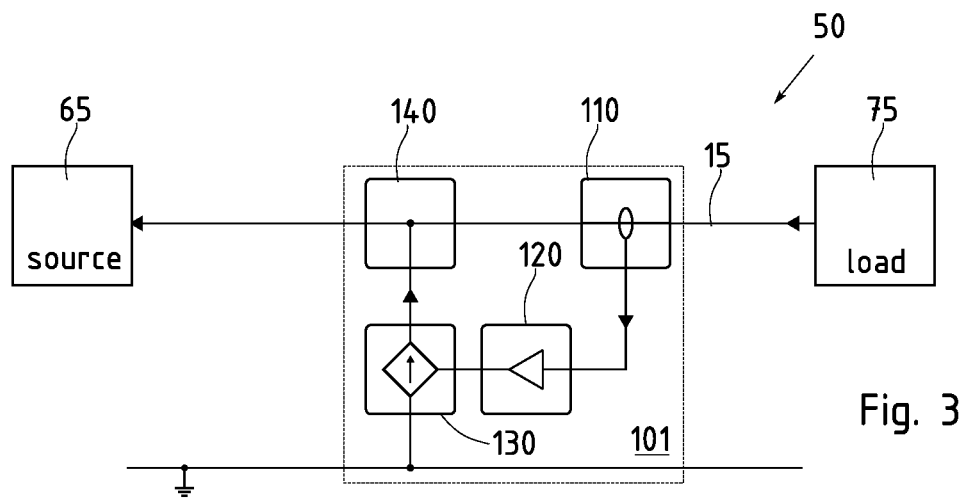
FIG. 3 illustrates schematically a filter according to the invention.

FIG. 3 illustrates a possible structure of a filter 50 according to the invention. It is drawn as a unifilar scheme, and power line 15 is represented by a single line. This is a simplification of a real implementation in which the power line 15 may include several conductors. In an important, but not exclusive, implementation, the supply line 15 may be a HVDC bus in an electric vehicle comprising a positive rail and a negative rail. The filter may be designed to attenuate a differential noise or, preferably, a common-mode noise component.

In the illustrated embodiment, the active filter has a feedback configuration with a current sense unit 110, which could be a current transformer, that reads the noise current flowing out of the output, as an error signal, an analogue signal conditioning stage 120 that is designed to amplify the error signal in a determined frequency band, a current source 130 that inserts, through the current injection circuit 140, a correction current on the supply line 15.

The filter presented has a "current sensing/current injecting" topology that sense a current and inject a corresponding correction current. The invention is not limited to this case, however, and may also include filters that sense the noise as a voltage disturbance of the supply line, and/or include a voltage source to inject a voltage on the supply line, or filters with an output circuit that is neither a pure current source nor a pure voltage source. The following description will introduce "current sense units" at the input of the filters, and "current sources" at the output but, they could be replaced by voltage sensors, respectively voltage sources, or by sensor and sources that are neither pure current nor pure voltage type, without leaving the scope of the invention.

As it is known an ideal feedback filter provides, in closed loop, an attenuation that is given by $Y=X/(1+H)$ where Y denotes the signal at the filter's output, X the signal at the input, and H is the open-loop gain. In reality, additional factors will be introduced by non-ideal behaviour of the sensor, and so on. The invention, however, is not limited to this topology of filter and may also include, for example, feed-forward filters.

Any active filter exhibits a dynamics limit, that is the maximum current that can be injected back on the supply line and rely on a power supply (not represented) for their work. Its performance is guaranteed into a determined bandwidth, where their operating parameters (for example the insertion loss) respect nominal values. The bandwidth of the filtering stages will be determined in consideration of the noise bandwidth. In a typical automotive application, a bandwidth of at least 1 MHz is required.

The active filter is inserted on the supply line after the noise source (eventually with a passive pre-filtering stage) and should be capable of injecting a current having the same intensity as the noise current. Demanding applications may have noise amplitudes of 2 A peak-to-peak or more, and the output dynamics of the first active filtering stage should match these figures.

Figure 4:
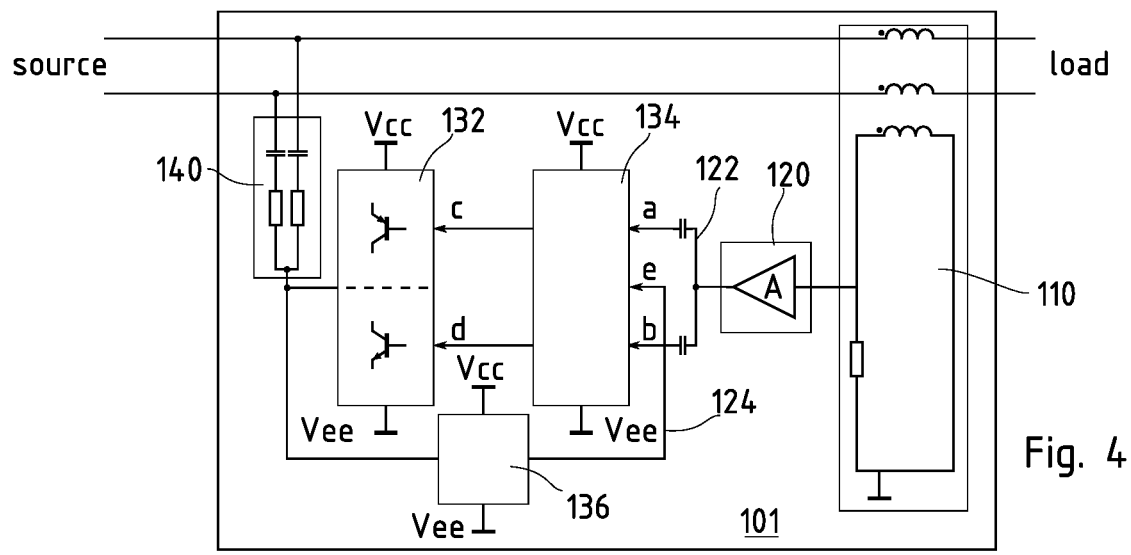
FIGS. 4 and 5 illustrate two possible configurations of the inventive active filter.

The required dynamic behaviour can be obtained by a filter configured as shown in FIG. 4. In this configuration the current source 130 has a common emitter network 132 whose operating point is determined by a bias network 134 and a PI (proportional-integral) control network 136 for stabilizing the DC component of the output. Importantly, the active filter of the invention has a unipolar supply rather than a more complex bipolar supply with positive and negative voltage rails.

The three stages: common emitter network 132, bias network 134, and PI control network 136 are designed to work in harmony and behave as a high-frequency voltage-controlled current source. Despite the apparent complexity over a conventional solution, the circuit of the invention has proved advantageous because it offers a high output impedance (thus approximating an ideal current source) at high frequency, a good stability, an extended temperature range, and is eminently suitable for building an active EMC filter in automotive applications.

Figure 6:
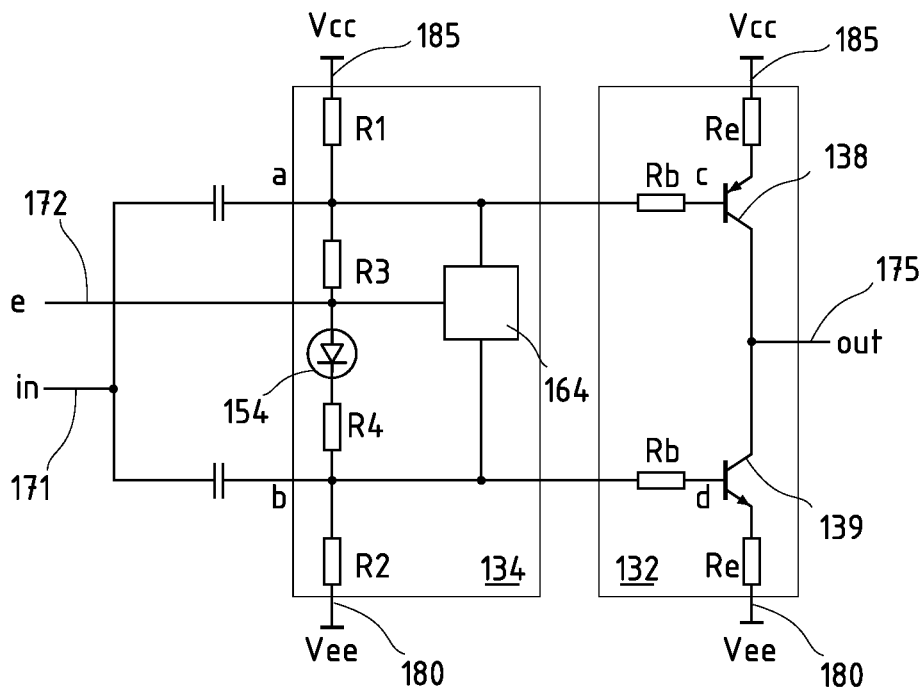
FIG. 6 is a simplified schematics of a common emitter output stage with a bias network.

The current output stage 132 is shown in FIG. 4 and in the simplified schematic of FIG. 6. It has two bipolar transistors in a symmetric common-emitter configuration: a PNP transistor 138 with the emitter connected to the positive supply 185 through a resistor Re of suitable value and a NPN transistors 139 with the emitter likewise connected to the negative supply 180, which may be the ground. The output 175 of the current stage 132 is at the collectors of the transistors. The bases of both transistors are AC-coupled with the HF input signal through the active bias network 134 that will be described further.

The stage may be configured to operate in class A, with both transistors in the active region always, or in class AB, the PNP transistor being active only for the positive polarity of the output current and the NPN transistor for the negative one, with a small region of class-A operation around the centre point.

Figure 7:
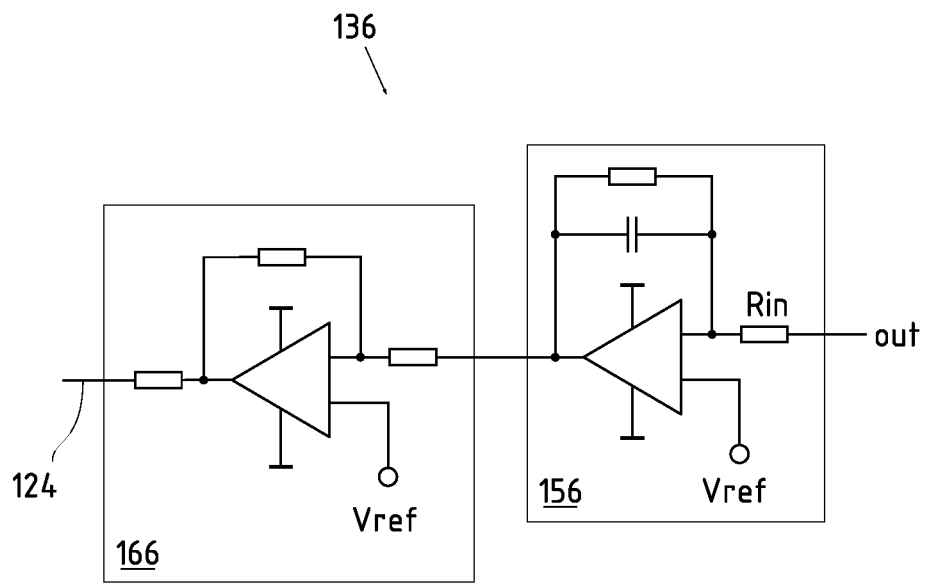
FIG. 7 is a simplified schematics of a control network used to stabilize a working point of the filter.

The inventors have found that the common emitter provides a high output impedance, which is desirable, but cannot perform alone satisfactorily in an active EMI filter. Since the output is AC coupled, the load impedance becomes very high at low frequency. Therefore, the DC gain tends to be much higher than the AC gain. This causes a drift of the output DC voltage (preferably at equal distance from the supply rails Vcc and Vee) because the transistors are only imperfectly matched. This instability is particularly dangerous in EMI filters since the current source may end in saturation, injecting deformed waveforms in the system and thus additional noise at high frequency. To overcome this, the invention has a control network 136 feeding back the DC value at the output to the correction node 172 (mark 'e') and keeps the output voltage fixed to a reference value. The control network 136 may be based on an integrator and a gain stage, implementing a P/I control, as in the simplified schematics of FIG. 7, but other configurations are possible. The input resistance Rin of the integrator 156 may have a value between 10 kΩ and 10 MΩ, to avoid loading the output of the stage 132 and to control the time constant of integration.

The integrator 156 is a low-pass filter and will be designed not to interfere with the high-frequency behaviour of the filter. Preferably, the cut-off frequency of the integrator will be well below the lower cut frequency of the desired EMI filter, for example one decade below. To fix the ideas, if the active EMI filter is meant to attenuate a noise between 10 kHz and 1 MHz, the cut-off frequency of the control network should be of 1 kHz maximum. The proportional stage 166 increases the accuracy of the control.

Since the control network 136 operates at low frequency and power, the integrator stage 156 and the gain stage 166 can be realized with suitable operational amplifiers. CMOS operational amplifiers exhibit very low input bias currents and exist in single supply rail-to-rail variety. They can be used advantageously in this application.

The output of the gain stage 166 is an offset DC voltage that is injected in a bias correction node 172 of the bias network 134.

The active bias network 134, visible in FIGS. 4 and 6, is designed to keep the DC bias of the common emitter network at the desired working point all over the temperature range of interest and to correct the different characteristics of the PNP and NPN transistors. It comprises a voltage reference 164 that keeps a constant voltage across the nodes "d" and "e" in all the temperature range of interest. The diode array 154 introduce a negative temperature coefficient, therefore the potential between nodes "c" and "d" changes with the temperature. As the voltage drop on R1 and R2 is kept equal, this leads to a temperature-dependent change in the transistors' base voltages that counterbalances the temperature characteristics of transistors 138 and 139. Additionally, by applying a voltage on the correction node 172, the potentials of nodes "c" and "d" can be shifted towards Vcc or Vee potential, thus increasing the base potential of one transistor and decreasing that of the complementary one, or inversely. This specific design of the bias active circuit, together with the feedback control unit 136 guarantees the proper DC operating voltage of all nodes (a, b, c, d, e, output) irrespective of the temperature.

Figure 5:
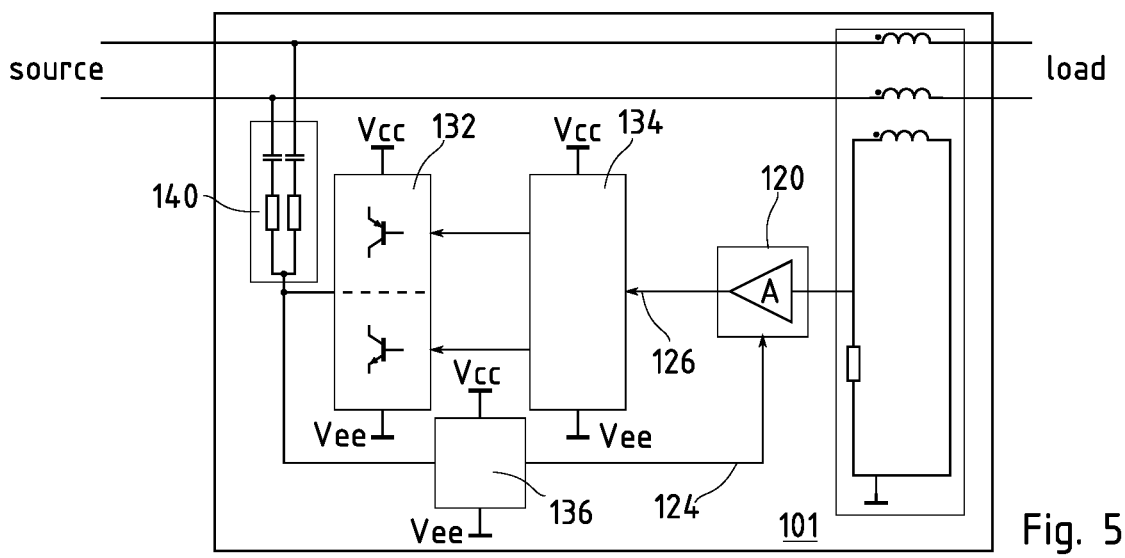

In the topology of FIG. 4 the control network 136 feeds back a DC signal 124 directly at a special correction node e of the active bias network k134, and, in so doing, keeps the operating points of the transistors stable in the temperature range of interest. This schematics represents a preferred solution but is not the only possibility for the invention. The operating point could be controlled also, as shown in FIG. 5, by feeding back the DC correction signal through the pre-gain stage 120 rather than directly to the active bias network 134. In this variant, the pre-gain stage 120 produces an input signal 126 for the bias network 134 that combines the HF signal sensed by the current transformer 110 and the DC correction signal 124.

The combination of common-emitter symmetric stage 132, active bias network 134 and control network 136 provides a voltage controller high frequency current source that has been found very suitable for the realization of active EMI filters in different industrial fields, especially for automotive applications. This system is more complex than many known HF sources but the complexity is rewarded with many important advantages, including:

high output impedance in large frequency range, for example 2 kΩ at 30 MHz (value dependent on the transistors' choice).

Stable operating point over an extended temperature range, for example between −40° C. and 125° C.

Single supply

High current capability, up to 5 A peak-to-peak

Stable output voltage at the middle point between power rails.

REFERENCE SYMBOLS IN THE FIGURES 15 supply line, DC bus
20 heat pump
25 battery pack
30 power distribution unit
40 DC/DC converter
45 charger 48 charge line
49 connector
50 EMC filter
51 passive filter
60 motor drive unit
65 noise source
70 motor
75 load, victim device
91*a* positive supply, input (source side)
91*b* positive supply, output (load side)
92*a* negative supply, input (source side)
92*b* negative supply, output (load side)
100 ECU
101 active filter stage (power stage)
110 current sense, current transformer, sense unit
120 amplifier, signal conditioning
122 HF input signal
124 DC input signal
126 HF and DC input signal
130 current source
132 common emitter network
134 bias network
136 control network
140 current injection
154 diode array
156 integrator
164 voltage reference
166 gain stage
171 input of the common emitter network
172 bias correction input
175 output of the common emitter network
180 ground or negative supply
185 positive supply

The invention claimed is:

1. A high-frequency current source for an active EMI filter comprising a output provided by an output network with two bipolar transistor in a symmetric common-emitter configuration connected between a upper supply rail with a first potential and a lower supply rail with a second potential, an active bias network determining the operating point of the two bipolar transistors, an analogue control network receiving the output and producing a DC correction signal that is fed to an error input of the active bias network to stabilize a DC value of the output, and a HF input controlling a high-frequency output current, wherein the analogue control network is configured to maintain the DC value of the output in a predetermined interval in the middle of a potential difference between the first and the second potential, wherein the analogue control network comprises a gain stage and an integrator stage in a low-pass filter configuration, and the active bias network comprises a voltage reference providing a constant voltage and a temperature-sensitive element introducing a temperature-dependent change in the base voltages of the transistors in the output network such that the DC value of the output is stabilized.

2. The high-frequency current source of claim 1, having a unipolar power supply.

3. The high-frequency current source of claim 1, having an output impedance of at least 1 kohm at 30 MHZ, an output capability of at least 1 A peak-to-peak and a temperature operating range extending at least between −40° C. and 125° C.

4. An active EMI filter comprising the high-frequency current source of claim 1.

5. The active EMI filter of claim 4, comprising a sense unit configured to sense a noise signal circulating in a power line from a noise source to a load, control the high-frequency current source according to the noise signal, inject the high-frequency output current of the high-frequency current source into the power line through a current-inject unit.

6. The active EMI filter of claim 4, wherein the noise signal is common-mode.

7. The active EMI filter of claim 4, wherein the sense unit is a current transformer coupling to a noise current on the power line.

8. Use of the active EMI filter of claim 4 on the power bus of an electric or hybrid vehicle.

* * * * *